Feb. 2, 1960 E. F. KLEINSCHMIDT 2,923,769

TAPE CONTROL TRANSMITTER

Filed Dec. 21, 1953 3 Sheets-Sheet 1

INVENTOR.

EDWARD F. KLEINSCHMIDT

BY

Strauch, Nolan & Diggins

ATTORNEYS

Feb. 2, 1960 E. F. KLEINSCHMIDT 2,923,769

TAPE CONTROL TRANSMITTER

Filed Dec. 21, 1953 3 Sheets-Sheet 2

INVENTOR.

EDWARD F. KLEINSCHMIDT

BY Strauch, Nolan & Diggins

ATTORNEYS

TAPE CONTROL TRANSMITTER

Filed Dec. 21, 1953 3 Sheets-Sheet 3

INVENTOR
EDWARD F. KLEINSCHMIDT
BY Strauch, Nolan & Diggins
ATTORNEYS 2,923,769
Patented Feb. 2, 1960

2,923,769

TAPE CONTROL TRANSMITTER

Edward F. Kleinschmidt, Wilmette, Ill., assignor to Smith-Corona Marchant Inc., a corporation of New York Application December 21, 1953, Serial No. 399,548
18 Claims. (Cl. 178—17)

The present invention relates to telegraph transmitting apparatus and more particularly to perforated tape controlled transmitting devices and tape feeding mechanism associated therewith.

An object of the present invention is to provide a mechanism for step-by-step feeding of a coded perforated tape wherein the tape feeding mechanism is operated rectilinearly through the release of tensioned springs.

Another object of the invention is the provision of a manual means for disengaging the tape feeding mechanism from the feed holes of the tape, the manual means being operable at any time.

A further object is the provision of mechanism to enable the tape to be moved forward or backward through the tape feed gate by merely pressing on the tape with the finger and pushing the tape in the required direction.

The above objects are accomplished by the provision of a tape sensing mechanism with a plurality of sensing fingers permutably set in accordance with the coded perforations of a previously perforated tape to control the transmission of electrical impulses indicative of the characters to be reproduced. Included with the tape sensing mechanism are means to move the tape forward step-by-step in timed relationship with the action of the sensing fingers.

The tape transmitter is a self-contained unit capable of transmitting teletypewriter signals at more than 600 operations per minute. It will operate with tape perforated by an associated typing tape reperforator or with standard $^{11}/_{16}$ inch perforated tape. It may be removed from its associated reperforator and used alone, or combined with other similar units in a "ganging" arrangement to form multiple transmitters having a common drive.

The message tape passes over a feed guide against which it is held by a tape guide cover. Five sensing levers are cam operated by means of a bail to be raised and lowered in a timed relationship with a tape feed claw. A sensing lever entering a code hole in the message tape blocks the "spacing" end of its associated selector lever thus causing the "marking" end of the lever to move the "marking" end of a contact bail to close the marking contact. If the sensing lever does not enter a hole when it is raised it will bear against the underside of the tape and its associated lever will not be blocked, causing the "spacing" contact to close. The message tape is fed step-by-step in the tape guide over the sensing levers by a feed claw. Motion is imparted to the feed claw by two cam and spring actuated levers. One lever causes the claw to engage the tape and withdraw after feeding and the other lever moves the claw back and forth a distance of one space. The aggregate motion of the feed claw is substantially rectangular. The camshaft is frictionally driven by a motor and is start-stop controlled by a magnet armature. The magnet circuit is controlled by several switches which include a manual on-off switch; an end-of-tape switch and a tight-tape switch. The end-of-tape switch is closed only when tape is present under the tape guide cover, and the "tight-tape" switch is closed only when sufficient slack is present between the transmitter and its supply source.

A clear understanding of the invention may be had from the following detailed description and with reference to the accompanying drawings in which.

To still further clarify the following specification, the operations are described in order of sequence of operation.

Figure 6:
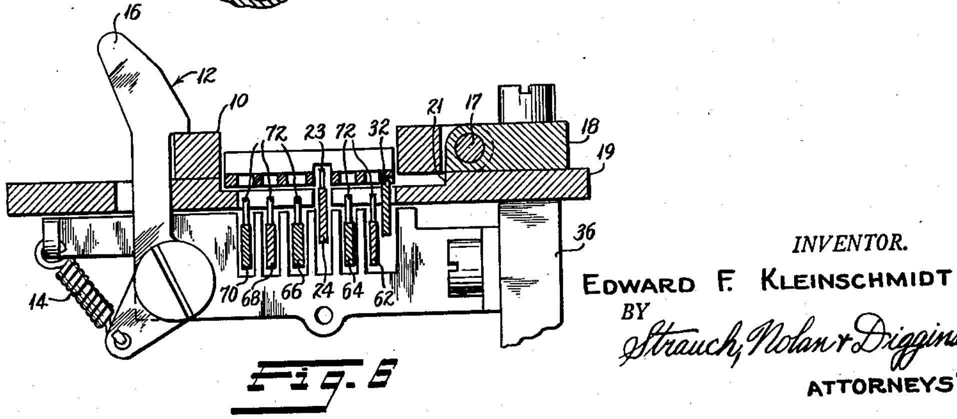
Figure 6 is a section of the tape feed gate taken on the line 6—6 of Figure 5.

The tape guide gate 10 (Figures 5 and 6) is held down by the latch 12 and spring 14. When the upward projecting trigger 16 of the latch 12 is manually pushed to the left (Figure 6) the guide gate 10, which is pivotally mounted on a shaft 17 on a fixed bracket 18 on the top cover plate 19 of the transmitter, will swing up clockwise as viewed in Figure 6 due to the biasing action of a coil spring 20 (Figure 5). With the gate 10 up, a tape 22 (Figure 2) provided with a longitudinal row of feed holes may be positioned within the longitudinally extending channel 21 of plate 19 with certain of its feed holes engaged by the teeth 23 on a feed claw 24. The subsequent closing and latching of the gate 10 will hold the tape 22 in place ready for transmission. A guide 26 (Figure 5), which is pivoted on the bracket 18, may be swung to a position in which it rests in a groove 28 in the surface of the tape guide plate 19 to adapt the tape feeding device to accommodate a narrower $^{11}/_{16}$ inch tape. In this manner, the tape feed is adapted to feed either a wide chad tape on which printing is performed along one edge of the tape or a narrow chadless tape on which printing is performed over the lidded apertures. The cover plate 30 (Figure 1) forms an extension of plate 19.

When a switch (not shown) is turned on, the transmitter will operate as the presence of tape 22 in the gate is effective to depress the end of a lever 32 (Figures 1, 2 and 6) which controls a switch in the circuit to the magnet 34 which controls the cam shaft start-stop operation. Having reference to Figure 2, the electromagnet 34 is supported by a bracket 35 to the rear mounting plate 36 of the unit and is electrically connected to a local power source through an appropriate control circuit. It is normally energized when the main power switch is closed and holds the armature 38 pivoted at 40, in its attracted position. Armature 38 is normally biased from its attracted position by a tensioning spring 42 which has one end secured to the armature 38 and its other end to a post 43. Armature adjusting screws 44 and 46 have screw threaded engagement with ears 45 and 47, respectively, of the mounting plate 36, to limit the extent of movement of the armature 38. When in its unoperated position, the knife edge 48 of a strip 49 secured to armature 38 engages a shoulder 50 at the left end of a cam shaft stop lever 51 which is pivoted at its right end on a post 52 secured to the mounting plate 36. Near the center of the stop lever 51 is a stop 54 which co-acts with either of the lugs 56 on the end of the selector cam drum 58 to prevent the rotation of the drum 58 when the magnet 34 is not energized and the unit is at rest. The camshaft 60 is journalled in the mounting plate 36 and is connected through the usual friction clutch to a constantly rotating power drive shaft which is suitably journalled in a frame and connected to the drive shaft of a motor.

Figure 1:
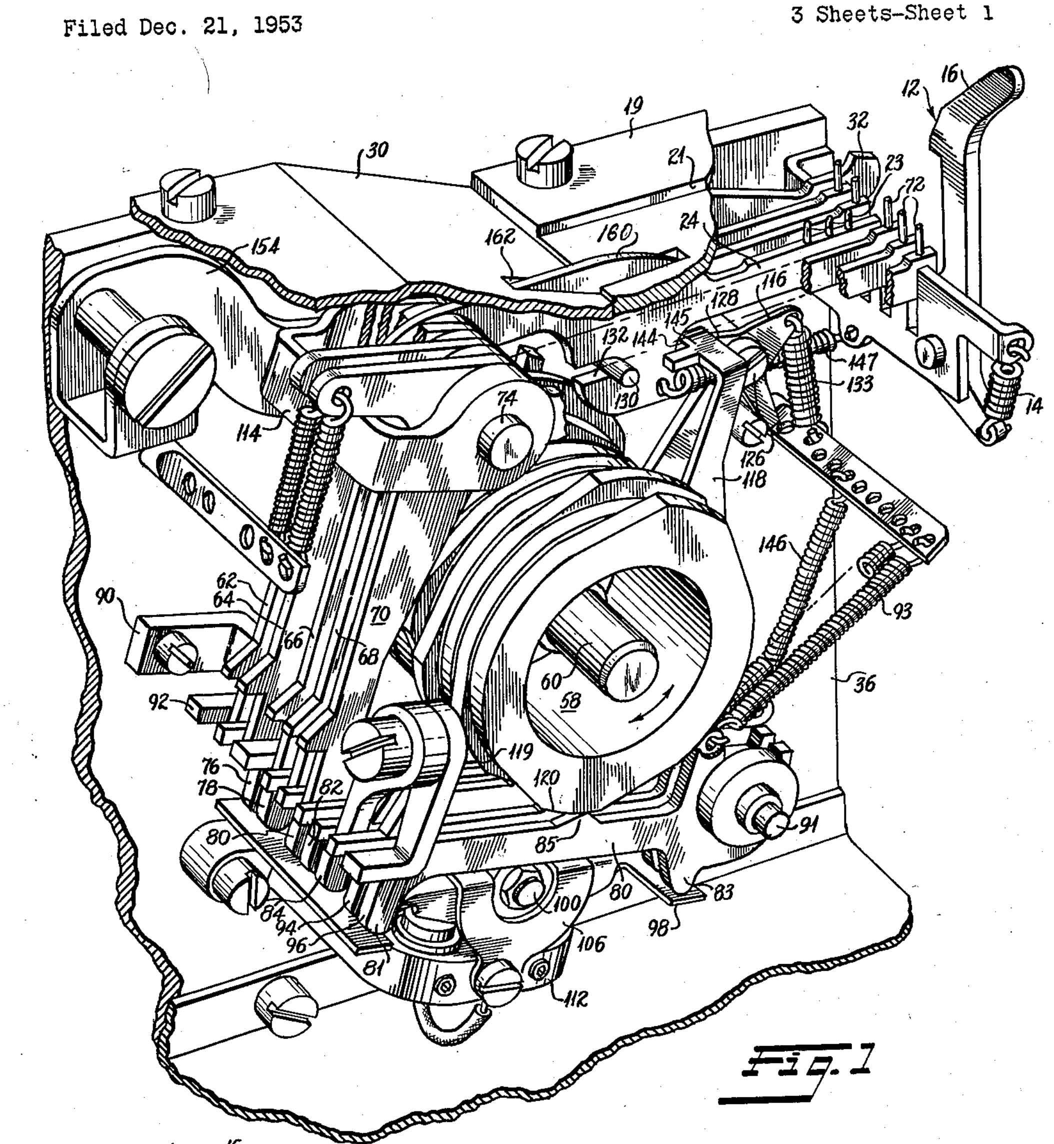
Figure 1 is a cutaway perspective view of the transmitter assembly.
Figures 2, 5:
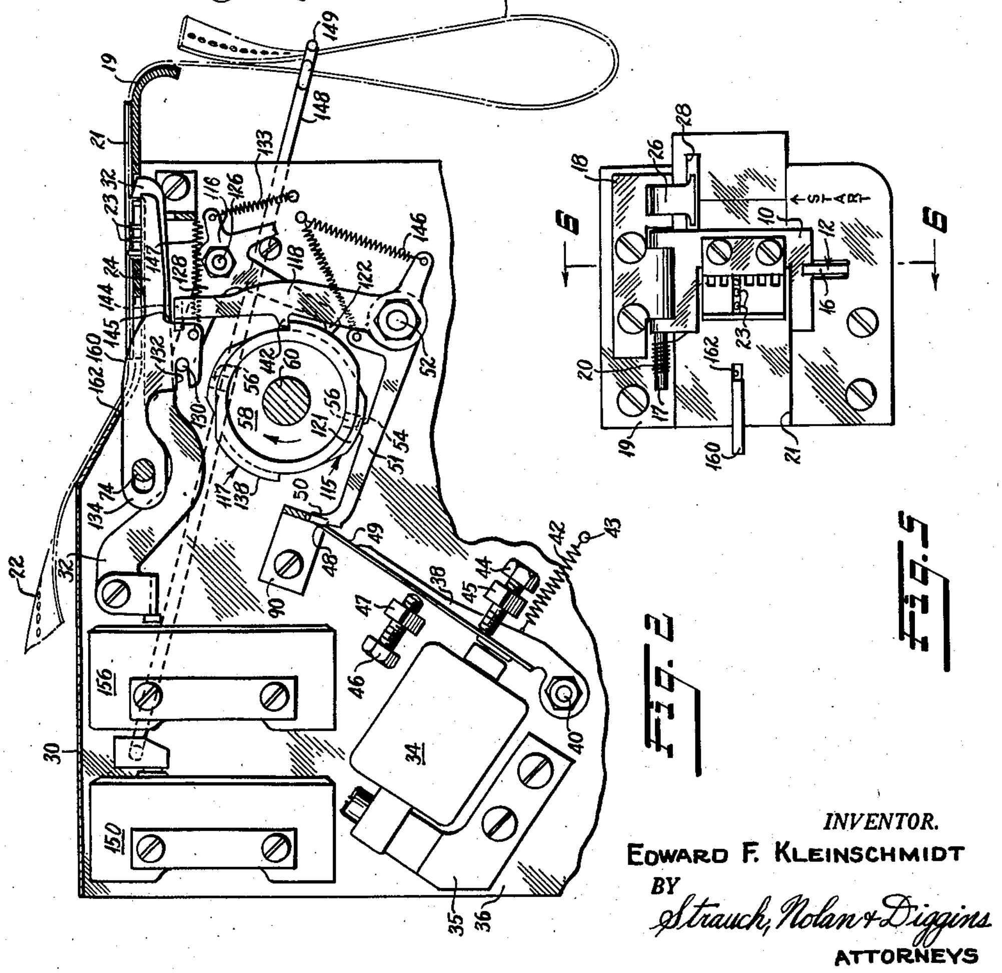
Figure 2 is a front elevational view of the tape feeding mechanism apart from the sensing mechanism.
Figure 5 is a top view of the tape feed gate.

Figure 1 shows a general view of the selecting mechanism and tape sensing levers which will now be described. The group of five sensing levers 62–70, one of which is shown in detail in Figure 3, have at their right ends sensing pins 72 adapted to engage code holes of the tape 22. These sensing levers 62, 64, 66, 68 and 70 are pivoted on a common support shaft 74 secured to the rear mounting plate 36 of the unit. The common pivot axis of levers 62, 64, 66, 68 and 70 is parallel to the axis of camshaft 60.

The sensing levers 62–70 each control one of a set of transmitter selector levers 76, 78, 80, 82 and 84, sensing levers 62, 64, 66, 68 and 70 controlling selector levers 76, 78, 80, 82 and 84 respectively. Each sensing lever is provided with a hooked lug 86 (Figure 3) at its lower end which is moved into and out of position below the hooked end 88 of the corresponding selector lever as its pin enters or does not enter a code hole in the tape. This movement will block or unblock the lever and thereby determine the subsequent movement imparted to it by the cam with which it is associated as will be explaind later. A bracket 90 (Figures 1 and 2) which is suitably secured to mounting plate 36, provided with a forwardly projecting comb portion 92 for supporting and guiding the sensing levers 62–70 in mutually spaced relation. The cam drum 58, secured to the camshaft 60, is provided with a series of axially spaced cam sections the lobes of which are arranged helically around the drum to effect sequential engagement and operation of the selector levers. In the particular embodiment of the invention herein disclosed, seven selector levers 76–78–80–82–84–94–96 are provided, one 96, for the start impulse, five 76–84 for the code impulses, and one 94 for the stop impulse. The cam drum 58 includes a cam section for each of the seven selector levers and three additional cam sections for purposes hereinafter described. Each of the cam sections has a pair of diametrically opposed raised portions, or cam lobes which, due to the helical arranement of the cam sections on the cam drum 58, successively engage their associated mechanism once during each one-half revolution of the cam drum 58. This in turn permits the transmission of code signals for two characters during each revolution of the cam drum.

Figure 3:
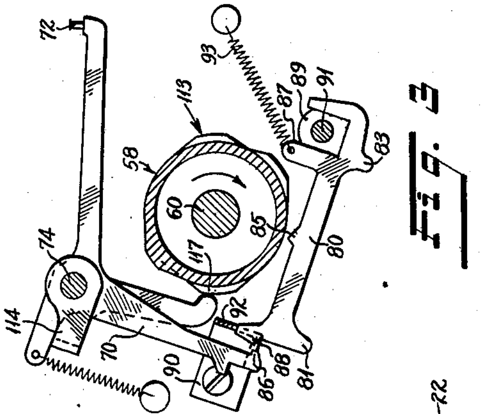
Figure 3 is a detailed view of the tape sensing mechanism apart from the feeding mechanism.

Each of the seven selector levers, one of which is shown in detail in Figure 3, has depending portions 81 and 83 adjacent its opposite ends, a cam follower 85, and a notch 87, which fits around a squared shoe 89 loosely held on the pivot post 91. A spring 93 is secured between a post and the lever 80 to normally hold the lever against the shoe 89 at one end and a stop on the comb member 92 at the other end. By this construction, the selecting levers are each mounted for pivotal and radial sliding movement relative to pivot post 91.

Figure 4:
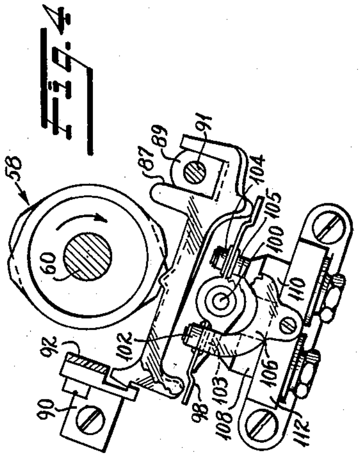
Figure 4 is a detailed view of the transmitting contacts and their associated operating mechanism.

The depending portions 81 and 83 of the selector levers engage and position a contact bail 98 (Figure 4) pivoted at 100 and having a pair of movable contacts 102 and 104 which are connected to the telegraph line by a V-shaped spring 106. A pair of stationary contacts 103 and 105 (Figures 1 and 4) cooperate with contacts 102 and 104 respectively to control the condition of the line circuit of the associated telegraph system. Contacts 103 and 105 are mounted in contact supports 108 and 110 which are adjustable screws engaging terminals fitted into a supporting block 112 formed of insulating material. The contacts 103 and 105 are plungers which are pressed upward by coil springs within the supports 108 and 110. The contact bail 98 is engaged near is ends by the depending portions 81 and 83 of the selector levers 80 with just sufficient clearance to permit the levers and contact bail to pivot without excessive lost motion.

In the embodiment of the invention shown herein, there are provided two sets of contacts to permit use in a telegraph system of the polarized current type as well as one of the neutral, or current and no current, type. The contact bail 98 is of sufficient width to be operated in turn by each of the seven selector levers 76, 78, 80, 82 and 84, which are capable of pivotable motion in either of two oppositely directed paths under the control of the sensing levers and cam drum to determine which contacts will be engaged, as well as by levers 94 and 96. Thus, if a sensing lever 70 (Figure 3) blocks the end 88 of its associated selector lever 80, as the latter is engaged by its cam lobe the opposite end will move radially of post 91 on the squared shoe 89 so that depending portion 83 will abut bail 98 to engage contacts 104 and 105. If the sensing lever 70 does not block the end of the selector lever 80, the selector lever 80 will pivot with the shoe 89 upon the post 91 and drop the depending end portion 81 to abut the bail 98 and close contacts 102 and 103.

Figure 7:
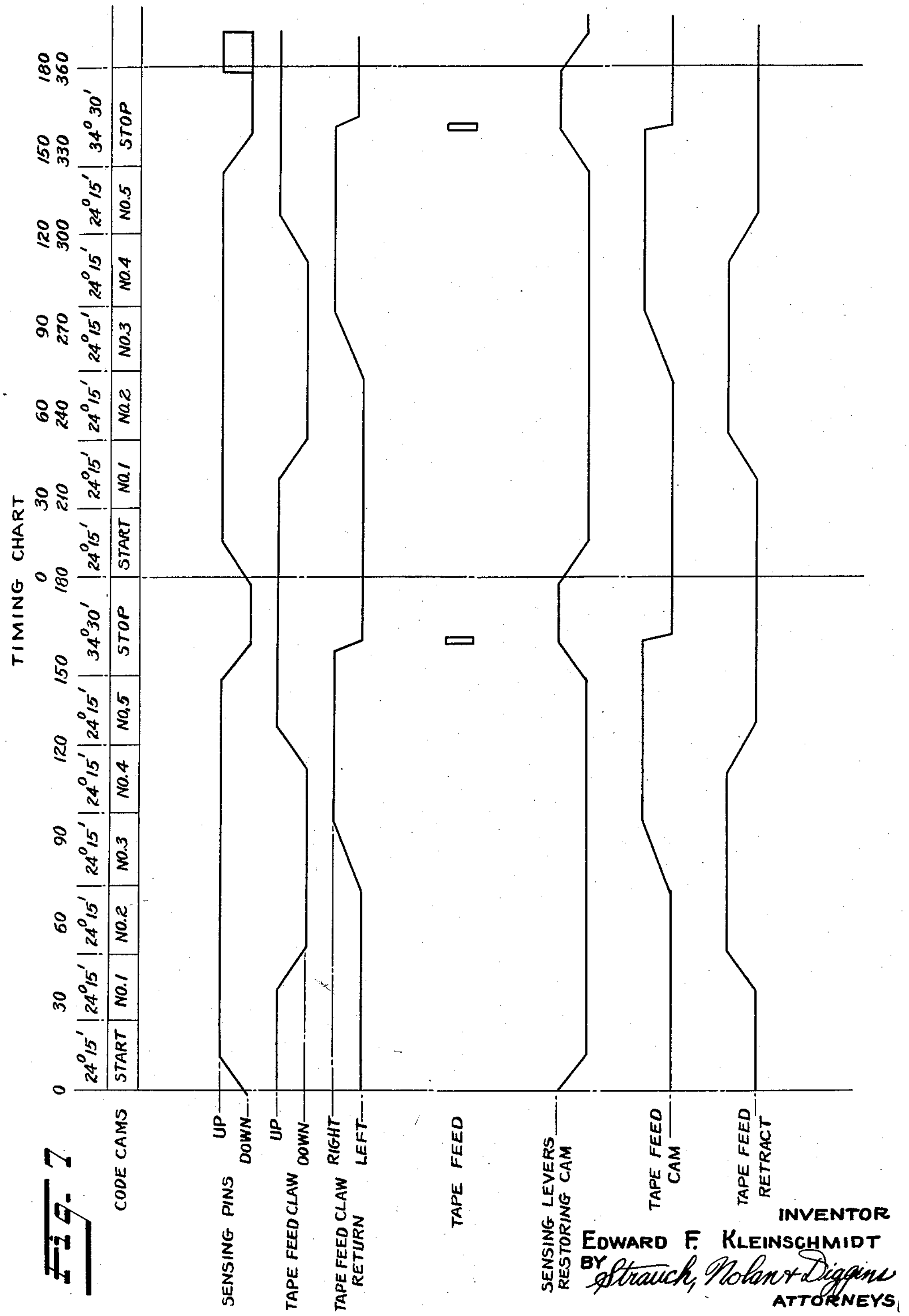
Figure 7 is a chart illustrating the relative time of operation of the several component parts.

Attached to the rear of the cam drum 58 are two diametrically opposite lugs 56 (Figure 2) which cooperate with the stop lever 51 as hereinabove described; the first cam section 113 (starting from the rear) operates the sensing lever lifting bail 114 (Figure 3); the second cam section 115 (Figure 2) raises and lowers the tape feed claw lever 116; the third and fourth operate code selector levers 76 and 78; the fifth 117 operates the tape feed retracting lever 118; the sixth, seventh and eighth operate code selector levers 80, 82 and 84; the ninth cam controls the stop selector lever 94 and tenth cam controls the start selector lever 96. The timed sequence of operation of these cams is illustrated in Figure 7 and will now be described in detail.

The first movement of the cam drum 58 following the unlatching by the dropping of the locking lever 51, causes the cam follower 85 of the stop selector lever 94 (Figure 1) to drop off the cam lobe 119 and immediately thereafter the adjacent lobe 120 of the start cam engages the cam follower 85 of the start selector lever 96 and, as there is no blocking member provided for the start selector lever 96, the cam lobe will press down on the lever 96 and cause it to pivot on post 91 to lower its left end to cause depending portion 81 thereon to press the contact bail 98 downwardly which will open contacts 104 and 105 and thereby place the associated telegraph line in a start (no-current) condition.

As the cam drum 58 thereafter continues to rotate, the depending cam follower arm integral with sensing lever lift bail 114 (Figure 3) drops off the lobe of the first cam section 113 and pivots in a counterclockwise direction as viewed in Figure 3. This movement of bail 114 releases the sensing levers 62, 64, 66, 68 and 70, which are individually spring biased in a counterclockwise direction about support shaft 74 as viewed in Figures 1 and 3, to permit their right hand ends carrying the tape sensing pins 72 to rise to a position in which the pin 72 abuts the tape in the event that there is no aligned perforation in the tape or in which the pin 72 passes through an aligned perforation in the tape in the event that there is such an aligned perforation.

Further rotation of the cam drum 58 causes its lobe to press down on the projection 85 of the number 1 selector lever 76 to control the position of the contact bail 98 in accordance with the blocked or unblocked condition of the sensing lever 62. Following the movement of the #1 selector lever 76, the cam lobe 121 of cam section 115 (Figure 2), the first of the two that are assigned to the tape feeding mechanism, deflects the follower 122 on the lever 116 to the right. The lever 116 is pivotally mounted on the post 126 which is in turn mounted on the rear mounting plate 36 of the unit. A leftwardly extending arm 128 of the lever 116 carries at its end a pin 130 which pivots and slides in a slot 132 in a depending portion of the tape feed claw 24. The complete lever 116 is normally biased in a clockwise direction about pivot post 126 by a spring 133 attached to an ear of the lever 116 and to a part of the frame 36. The extreme left end of the tape feed claw 24 also has a slot through which is slidably received the shaft 74 fixed to the frame 36 which allows the tape feed claw to pivot and/or slide in a vertical plane. Carried at the right end of the tape feed claw 24 are the three pins or teeth 23 arranged in longitudinal alignment to engage three adjacent feed holes in the tape 22. Movement of the follower 122 will turn the lever 116 in a counterclockwise direction about the post 126 thus dropping its arm 128. The pin 130 will pull down on the claw 24 and, as its left end is held against downward or leftward movement by its pivotal connection to shaft 74, cause claw 24 to pivot in a clockwise direction thus disengaging the pins 23 from the tape feed holes.

Further rotation of cam drum 58 causes a lobe to press down on #2 selector lever 78 in the same manner as previously described for the #1 selector lever 76. Still rotating in a clockwise direction as viewed in Figure 2, the cam drum 58 now brings the cam lobe 138 (Figure 2) in contact with the follower 142 in the middle of the claw retracting lever 118. The claw retracting lever 118 is pivoted on the post 52 and has an upwardly extending arm which has a turned over shoulder 144 which engages the right edge 145 of the depending portion of the tape feed claw 24. The claw retracting lever 118 is biased in a counterclockwise direction by a spring 146. As the follower 142 rides up on the cam lobe 138, it moves the lever 118 to the right to allow the feed claw 24 to move to the right through the pull of a spring 147. The pins 23 of the feed claw 24 are now directly underneath the next adjacent set of three feed holes, that is, a set of three feed holes including two of the previously engaged set and one new feed hole. Further rotation of cam drum 58 brings #3, 4, and 5 selector cams into play to actuate selector levers 80, 82 and 84 in sequence. During the movement of the #4 selector lever 82, the follower 122 on the lever 116 which imparts the up and down motion to the feed claw 24, rides down its cam lobe 121. The feed claw 24 will then rise into engagement with the aligned set of feed holes in the tape due to the upthrust imparted through pin 130 by the clockwise movement of the lever 116. Immediately after the #5 selector lever 84 has operated the contact bail 98, the follower arm on the sensing lever lift bail 114 rides up on the cam lobe of cam section 113 diametrically opposed to the lobe from which it dropped upon initiation of operation and the associated bail 114 pivots the five sensing levers in a clockwise direction in opposition to their biasing springs to disengage pins 72 from the code holes of the tape 22. This operation is simultaneous with the engagement of the #6 selector lever 94 with its cam to pivot the contact bail 98 for a stopping impulse. Further rotation causes the follower 142 on the retracting lever 118 to drop off an abrupt shoulder of the cam lobe 138 which causes its upper end to be jerked to the left by the spring 146. As the shoulder 144 at its upper end is in engagement with the edge 145 of the depending portion of the feed claw 24 and as the spring 146 overpowers the spring 147, the feed claw 24 is jerked to the left. The tape is thus pulled one character space to the left. As can be seen from the above description of the feed claw mechanism, its movement follows a substantially rectangular pattern, consisting of two rectilinear movements joined by two pivotal movements. If the magnet armature 38 has moved to the right due to its magnet 34 becoming de-energized, the lug 56 will engage the latch 54 and the cam drum 58 will be held from turning through slipping of the clutch connecting it to the motor drive shaft.

Three actions can cause the magnet 34 to become de-energized: In series with it and a local source of electrical power are an off-on switch, a tight-tape switch 150 (Figure 2) and a tape out switch 156. The off-on switch is a toggle which allows the tape transmitter to be stopped manually at any time without turning off the driving motor. The tight-tape switch 150 operates by the lifting of the arm 148. The end 149 of the arm 148 is bent to hold a loop of tape which if pulled tight due to stopping of the supply source will raise the arm 148 thus opening switch 150 and breaking the magnet circuit. Another switch 156 operates from the lever 32 the end of which projects through an opening in the feed guide plate 19. Presence of tape in the gate 10 depresses the lever 32 holding the switch 156 and magnet circuit closed.

It is desirable to be able to disengage the feed claw 24 from the message tape when the transmitter is in its stopped condition to enable an attendant to feed a tape into the gate without lifting the gate 10, also it is advantageous to be able to move the tape forward or backward without unfastening the gate 10. The structure by which this is accomplished will now be described. The feed claw 24 (Figures 1 and 2) has an upwardly projecting rounded portion 160 which passes through slot 162 in the tape guide plates 19 and 30. When the transmitter is idle, the feed claw 24 is in engagement with the tape 22 making it impossible to move the tape without tearing the feed holes. An attendant may press on the tape at the point where it passes over the projecting portion 160 of the feed claw 24 which action will depress the feed claw 24 thus disengaging the tape. He may then push the tape forward or backward with short strokes on the projecting rounded portion 160 until the desired amount of tape has been backed up or pulled through. In starting a tape into the transmitter the attendant has only to press on the projection 160 which lowers the claw 24 and while holding the projection 160 down feed the tape under the gate 10 far enough to place the first feed hole of the tape over one of the teeth 23 of the feed claw 24. Subsequent release of the projection 160 will allow the claw to rise and engage the feed hole to start the tape moving as soon as the transmitter is turned on. Should it become necessary to stop the tape at any time while the transmitter is operating this may be done by pressure on the tape above the projection 160. The tape will thus be held from moving and the feed claw lever will reciprocate in its retracted position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a tape feed device operative upon a tape containing a row of pre-punched feed holes longitudinally thereof to move such a tape along a predetermined path, a member movable into and out of engagement with such a tape and engageable with the feed holes of such a tape when in such path, and reciprocally and rectilinearly movable to advance said tape, and operating means for said tape feed member including cam operated means cooperating with said member and associated coil springs alternately tensioned and relieved by said cam operated means to impart reciprocal and rectilinear motion to said tape feed member.

2. In a tape feed device operative upon a tape containing a row of pre-punched holes longitudinally thereof, a spring biased member having a claw for engaging feed holes of such a tape and movable reciprocally and rectilinearly into and out of engagement with such a tape to advance said tape, a spring biased lever engaging said member, cam means for operating said lever and a cooperating coil spring to impart reciprocal rectilinear motion to said feed claw through the alternate tensioning and releasing of said coil spring, and a second cam operated lever means engaging said member to raise and lower said feed claw into and out of engagement with the tape in timed relationship to the reciprocating motion of said member.

3. In a tape feed device operative upon a tape containing pre-punched feed holes longitudinally thereof, a tape guide plate, a claw member engageable with such feed holes and operable rectilinearly to advance said tape, said claw member having a projection with a smooth gradually curved portion extending through said tape guide plate under the path of such a tape, said projection being manually depressable to disengage said claw member from the feed holes of such a tape to allow free movement of said tape forward or backward over said guide plate.

4. In a tape feed device operative upon a tape containing pre-punched feed holes longitudinally thereof, a tape guide plate, a claw member engageable with such feed holes and operable rectilinearly to advance said tape, a rounded projection on said claw member extending through said tape guide plate beneath such a tape, said projection being depressable by the manual act of pressing down upon a tape over said projection, the depression of said tape and rounded projection being effective to disengage said feed claw from such tape feed holes to allow said tape to be manually moved forward or backward along its path.

5. A tape feeding device operative to intermittently impart rectilinear movement to a tape preformed with a longitudinally extending row of feed holes, said tape feeding device comprising a tape feeding member, means engaging and guiding said tape feeding member for movement in and enabling cyclic operation of said tape feeding member through a closed path including a first rectilinear portion in which said member is operative to engage the feed holes of a tape in such tape feeding path and a second portion in which said member is withdrawn in a substantially perpendicular direction from engagement with and is inoperative to so engage such a tape, and means operative to move said member along said closed path to effect intermittent advance of a tape along such rectilinear tape path.

6. A tape feeding device operative to intermittently impart rectilinear movement to a tape preformed with a longitudinally extending row of feed holes, said tape feeding device comprising a tape feeding member mounted for pivotal and rectilinear movements cyclically in a closed path, means operative to pivot said member from a first position in which it is operative to engage the feed holes of such a tape to a second position in which it is inoperative to engage the feed holes of such a tape, means operative after such tape disengaging movement of said member to said second position to shift said member rectilinearly to a third position in which said member is inoperative to engage the feed holes of such a tape, said third position being offset along the path of tape movement by at least one tape feed space relative to said second position, means operative upon completion of movement of said member to said third position to pivot said member into a fourth position in which it is operative to engage the feed holes of such a tape in a position offset from said first position by at least one feed hole space, means operative after movement of said member to said fourth position to move said member in a rectilinear path to said first position to thereby effect advancement of a tape engaged thereby.

7. A tape feeding device operative to intermittently impart rectilinear movement to a tape performed with a longitudinally extending row of feed holes, said tape feeding device comprising a tape feeding member mounted for pivotal and rectilinear movement cyclically in a closed path, means operative to pivot said member from a first position in which it is operative to engage the feed holes of such a tape to a second position in which it is inoperative to engage the feed holes of such a tape, means operative after such tape disengaging movement of said member to said second position to shift said member rectilineary to a third position in which said member is inoperative to engage the feed holes of such a tape, said third position being offset along the path of tape movement by at least one tape feed space from said second position, means operative upon completion of movement of said member to said third position to pivot said member into a fourth position in which it is operative to engage the feed holes of said tape in a position offset from said first position by at least one feed hole space, means operative after movement of said member to said fourth position to move said member in a rectilinear path to said first position to thereby effect advancement of a tape engaged thereby, and means cyclically operative in timed relation with the movement of said member to engage such a tape to prevent movement thereof so long as said member is inoperative to engage such a tape.

8. The tape feeding device defined in claim 7 wherein said tape engaging means is a tape perforation sensing finger.

9. A tape feeding device operative to intermittently impart rectilinear movement to a tape preformed with a longitudinally extending row of feed holes, said tape feeding device comprising a tape feeding member mounted for pivotal and rectilinear movement in a plane normal to the path of tape movement, a first lever engaging said member and operative to control the pivoted position of said member, a spring biasing said member to impart rectilinear movement to said member in a first direction, a second lever engaging said member and operative to oppose the biasing action of said spring, and cam controlled means for successively so actuating said levers as to cyclically move said tape feeding member through a closed path including a first rectilinear portion in which it is operative to engage the feed holes of such a tape in such tape feeding path and a second and remaining portion in which said member is inoperative to so engage such a tape.

10. The tape feeding device defined in claim 9 wherein said cam controlled means includes a second spring stronger than said first spring and connected to said second lever to bias said second lever against said member in opposition to said first spring and a cam cyclically operative to engage said second lever in opposition to said second spring to permit said first spring to effectively act upon said member.

11. The tape feeding device defined in claim 10 wherein said member is provided with a portion intermediate its pivot axis and its tape feed hole engaging portion manually engageable through said tape to effect pivotal movement of said member to a tape feed hole disengaged position independently of said cam controlled means whereby a tape may be freed of control by said member for manual positioning without interruption of the cyclical movement of said member.

12. A perforated tape feeding device adapted to accommodate perforated tapes of varying widths comprising means forming a tape feed channel defined by a bottom tape support surface and spaced parallel tape guiding side walls, a tape advancing mechanism including a cyclically operative toothed claw adapted to engage successive tape feed holes in such a tape to effect advancement of such a tape along said channel, and shiftable means, adjacent said tape advancing mechanism selectively operable to a position to coact with one side wall and a portion of the tape support surface of said channel between said means and said one side wall to define a tape guide channel of lesser width to accommodate a narrower tape.

13. A perforated tape feeding device adapted to accommodate perforated tapes of varying widths comprising means forming a tape feed channel defined by a bottom tape support surface and spaced parallel tape guiding side walls, a tape advancing mechanism adapted to engage successive tape feed holes in such a tape to effect advancement of such a tape along said channel, and shiftable means, adjacent said tape advancing mechanism, selectively operable to a position to coact with one side wall and a portion of the tape support surface of said channel between said means and said one side wall to define a tape guide channel of lesser width to accommodate a narrower tape.

14. A perforated tape feeding device adapted to accommodate perforated tapes of varying widths comprising means forming a tape feed channel defined by a bottom tape support surface and spaced parallel tape guiding side walls, a tape advancing mechanism cyclically operative to engage successive tape feed holes in such a tape to effect advancement of such a tape along said channel, the bottom surface of said channel having a narrow longitudinally extending groove formed therein in spaced parallel relation to one of said side walls, an auxiliary tape guide mounted for movement between an inoperative position remote from said channel and an operative position between the side wall of said channel and extending into said groove to coact with the other of said side walls and the portion of the tape supporting surface therebetween to form a tape feed channel of lesser width to accommodate a narrower tape than that which may be fed between the channel side walls.

15. A telegraph transmitter comprising a group of elements for sensing coded signal perforations in a tape; a group of rotatable cams; means under control of said group of elements and movable by certain cams in said group of cams for transmitting electric pulses represented by said group of elements in accordance with a sensed signal perforation in such a tape; a reciprocable and rectilinearly movable member adapted to engage feed holes of such a perforated tape; shiftable means operated by other cams of said group of cams and cooperating with said member; and associated coil springs cooperating with said shiftable means and with said member whereby said other cams of said group of cams enable a sequential shift of said member in one direction horizontally under a resilient biasing force and one direction vertically to thereby tension said coil springs and permit sequential movement of said member under coil spring tension in the other direction horizontally and the other direction vertically the positive shift of said member in said one direction vertically being away from tape engaging position and enabled by a portion of said shiftable means and one of said other cams and the movement of said member in said other direction vertically under coil spring tension force being toward tape engaging position; means structurally interrelating said certain cams and said other cams and said member to provide a shift of said member through both vertical movements and one horizontal movement within the period that said means under control of said group of sensing elements transmits the electric pulses represented by a coded signal perforation in such a tape.

16. A tape feeding device operative to intermittently impart rectilinear movement to a tape preformed with a longitudinally extending row of feed holes, said tape feeding device comprising: a tape feeding member mounted for pivotal and rectilinear movement in a plane normal to the path of tape movement; a first lever engaging said member and operative to control the pivoted position of said member; a spring biasing said member to impart rectilinear movement to said member in a first direction; a second lever engaging said member and operative to oppose the biasing action of said spring; and cam controlled means for successively so actuating said levers as to cyclically move said tape feeding member through a closed path including a first rectilinear portion in which it is operative to engage the feed holes of such a tape in such tape feeding path and a second and remaining portion in which said member is inoperative to so engage such a tape, said cam controlled means including a second spring stronger than said first spring and connected to said second lever to bias said second lever against said tape feeding member in opposition to said first spring and a cam cyclically operative to engage said second lever in opposition to said second spring to permit said first spring to effectively act upon said member; and said member having a portion intermediate its pivot axis and its tape feed hole engaging portion manually engageable through said tape to effect pivotal movement of said member to a tape feed hole disengaged position independently of said cam controlled means whereby a tape may be freed of control by said member for manual positioning without interruption of the cyclical movement of said member.

17. In a telegraph transmitter operative upon a code perforated tape: a tape guide plate; a group of elements for sensing the coded perforations in such a tape; a group of rotating cams; means under the control of said group of elements and movable by said cams for transmitting electric pulses represented by such coded perforations; a claw member adapted to engage feed holes of such a perforated tape; means structurally correlated with said means under the control of said group of sensing elements for imparting reciprocal and rectilinear motion to said claw member to advance such a tape and, within the period of transmitting the electric pulses representing the perforated signal being sensed, to sequentially remove said claw member from such a tape, shift said claw member relative to such a tape and re-engage said claw member with such a tape; and a projection of said claw member manually engageable through such a tape guide plate, said projection being manually operable to disengage said claw member from the feed holes of such tape while said reciprocating means continues to operate.

18. A telegraph transmitter as defined in claim 17 wherein said claw member has a slotted aperture, and a shaft is disposed in said transmitter providing a common pivot axis for said group of sensing elements and projects through said slotted aperture to support said claw member for pivotal and reciprocable movement.

References Cited in the file of this patent

UNITED STATES PATENTS

| | | |
|---|---|---|
| 478,531 | Wilcox | July 5, 1892 |
| 741,463 | Courville | Oct. 13, 1903 |
| 2,273,081 | Zenner | Feb. 17, 1942 |
| 2,278,196 | Fluharty | Mar. 31, 1942 |
| 2,389,200 | Lake | Nov. 20, 1945 |
| 2,404,339 | Zenner | July 16, 1946 |
| 2,407,818 | Almeida | Sept. 17, 1946 |
| 2,463,696 | Keyes | Mar. 8, 1949 |
| 2,550,411 | Gemmel | Apr. 24, 1951 |
| 2,571,182 | Baldwin | Oct. 16, 1951 |
| 2,586,669 | Lake | Feb. 19, 1952 |
| 2,639,148 | Adams | May 19, 1953 |
| 2,672,508 | Lang | Mar. 16, 1954 |

UNITED STATES PATENT OFFICE

CERTIFICATE OF CORRECTION

'atent No. 2,923,769 February 2, 1960

Edward F. Kleinschmidt

It is hereby certified that error appears in the printed specification of the above numbered patent requiring correction and that the said Letters Patent should read as corrected below.

Column 3, lines 25 and 26, for "explaind" read -- explained --; line 43, for "arranement" read -- arrangement --; column 8, lines 11 and 12, for "rectilineary" read -- rectilinearly --; line 57, beginning with "11. The tape" strike out all to and including "of said member." in line 65, same column 8; columns 8, 9, and 10, the claims numbered 12 through 18 should read 11 through 17 instead of as in the patent; column 10, line 49, for the claim reference numeral "17" read -- 16 --; in the heading to the printed specification, line 6, for "18 Claims." read -- 17 Claims. --.

Signed and sealed this 16th day of August 1960.

(SEAL)
Attest:

KARL H. AXLINE
Attesting Officer

ROBERT C. WATSON
Commissioner of Patents